United States Patent Office 3,533,929
Patented Oct. 13, 1970

3,533,929
ELECTROCHEMICAL DEIONIZATION
Sheldon Evans, Woodland Hills, Calif., and Walter S. Hamilton, Denton, Tex., assignors to North American Rockwell Corporation, a corporation of Delaware
No Drawing. Filed Sept. 22, 1967, Ser. No. 669,721
Int. Cl. B01k 5/00
U.S. Cl. 204—149    5 Claims

ABSTRACT OF THE DISCLOSURE

Device and process for deionizing which uses electrodes comprising carbon and weak ion exchange resins, said ion exchange resins being electrochemically dissociated.

---

This invention resulted from work done under Contract No. 14-01-0001-334 with the Office of Saline Water in the Department of the Interior, pursuant to the Saline Water Act, 42 U.S.C. 1951–1958(g) (1964).

BACKGROUND OF THE INVENTION

Ion exchange resins have been known and used in the prior art to remove ions from solutions. These resins are divided into two classes: acidic ion exchange resins, useful for removing cations, and basic ion exchange resins, useful for removing anions. Acidic ion exchange resins are sometimes called cation exchange resins and basic ion exchange resins are sometimes called anion exchange resins. A further distinction is made between "weak" and "strong" ion exchange resins. Thus, ion exchange resins are sold as strongly acidic, weakly acidic, strongly basic and weakly basic. Examples of strongly acidic ion exchange resins would be those terminated by an $SO_3H^-$ or a $PO_3H_2^-$ group, while strongly basic ion exchange resins are exemplified by terminal quaternary amine groups.

PRIOR ART

Strongly acidic ion exchange resins can remove cations from solutions that are basic, neutral and slightly acidic. Correspondingly, strongly basic ion exchange resins can remove anions from solutions that are acidic, neutral, and slightly basic. However, after a period of operation, whose length is dependent upon the quantity of ions removed and the quantity of ion exchange resins present, any ion exchange resin must be regenerated. In the case of a strongly acidic or strongly basic ion exchange resin, this regeneration is a much more expensive procedure than it is for the weakly basic or weakly acidic ion exchange resin. This additional expense is necessitated by the additional quantity of regenerative chemical required by the strong ion exchange resin. Accordingly, weak ion exchange resins are preferred in many applications. However, weak ion exchange resins have been found to be unsuitable in applications where the pH is close to 7. This unsuitability is caused by the relative absence of undissociated molecules in a weak ion exchange resin and a correspondingly few number of sites for capture of ions. In an attempt to compensate for this, solutions to be purified of anions are frequently made acidic, thereby dissociating more of the weak base ion exchange resin. Naturally, as the solution is made more acidic, the resin becomes more effective as more molecules dissociate. Similarly, if a solution is to be purified of cations by weakly acidic ion exchange resins and this solution is normally neutral, it must be made basic by the addition of hydroxyl ions. Needless to say, this alteration of the pH involves additional expense. However, in many instances, weak ion exchange resins are nevertheless preferred to strong ion exchange resins for deionizing neutral solutions, because, although operating expenses are increased by the pH adjustment, regenerative economies more than offset this additional expense.

It is an object of this invention to provide a method and apparatus for deionizing solutions using weak ion exchange resins.

It is a further object of this invention to provide a method and apparatus for deionizing neutral solutions using weak ion exchange resins.

Other and more specific advantages of this invention will become apparent from the following description.

DESCRIPTION OF THE INVENTION

The process of the instant invention comprises electrochemical controlling of the dissociation of weak ion exchange resins. This electrochemical controlling is carried out by means of a formed electrode comprising carbon and a weak ion exchange resin. An operational electrode used to exchange cations (e.g., $Na^+$) would comprise carbon and a weak acid exchange resin. For the purposes of this disclosure, such an electrode will be called a cation exchange electrode. An operational electrode used to exchange anions (e.g., $Cl^-$) would comprise carbon and a weak base exchange resin. For the purposes of this disclosure, this electrode will be termed the anion exchange electrode.

As is known by those skilled in the art, weak acids and bases are substantially undissociated in neutral solutions. Typically, only about one in 100,000 molecules are dissociated. However, in solutions varying from neutral, this dissociation equilibrium can be substantially different. In a solution having a pH of 2, for instance, a weak base ion exchange resin would be substantially dissociated.

While not wishing to be bound by theory, applicant feels that the mechanism of the invention involves an electrically produced localized volume of electrolyte having a pH differing radically from that of the electrolyte as a whole. In this localized volume, a weak resin can be substantially dissociated, providing a large number of sites for ion capture. The resin is thus dissociated in a solution whose bulk pH does not favor substantial dissociation. Examples of such solutions are those having bulk pH's between 6 and 8.

Using an anion exchange electrode as an example, carbon is mixed with a weak basic resin. Upon the application of current such that the anion exchange electrode is made positive, $H^+$ ions form near the surface of the carbon. If a hydrogen ion so formed is proximate to a weakly basic ion exchange resin, e.g., $RNH_3OH$, where R is the polymer network holding the exchange groups, the resin is dissociated according to the equation $$RNH_3OH + H^+ \rightarrow RNH_3^+ + H_2O$$

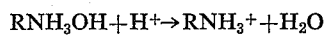

providing a site on the resin molecule which can react with anions, e.g., $Cl^-$, thereby removing these anions from the electrolyte. Of course, any weak base ion exchange resin can be used at the anion exchange electrode. These weakly basic resins typically include amine or polyamine groups.

In the case of a cation exchange electrode that is made negative by the application of current, $OH^-$ ions form near the surface of the carbon, producing a localized volume of high pH. When this volume is proximate to a weakly acidic molecule, e.g., $RCOOH$, where R is as previously defined, the weak acid dissociates according to the equation $RCOOH + OH^- \rightarrow RCOO^- + H_2O$. The ionized acidic resin can then accept a cation, for example $Na^+$, thereby removing these cations from the electrolyte. These weak acidic ion exchange resins can be terminated by carboxylic groups, by phenols or by other groups known in the art.

The carbon used in the instant invention must only meet the functional requirement of being able to support the electrochemical reaction, i.e., to generate $H^+$ or $OH^-$ ions. It is preferably finely powdered so as to be suitable for intimate mixing with the ion exchange resin to form the desired electrode. The electrodes of the instant invention are preferably formed by casting from a mixture of resin, carbon and binder. Adhesive elastomers have been found to be suitable binders, although other substances such as epoxys are clearly suitable. However, electrodes could be formed from pure carbon with a layer of resin and carbon affixed thereto. It must be appreciated that the physical form and method of manufacture of the particular electrode is not critical. It is merely necessary that the final carbon particles be intimately mixed with the resin particles.

The percentage composition of resin and carbon is not critical to this invention. It can be readily seen that if an excessive percentage of carbon is used, there will be few resin sites on which ions can be absorbed. Correspondingly, if an excessive proportion of resin is used there will be insufficient carbon to produce the electrically enhanced dissociation characteristic of this invention. In practice it has been found that roughly equal proportions, by weight, of carbon and resin are preferred. Similarly, ideal or even ranges of currents or voltages cannot be recited. With even a trickle of current with very small voltage the microscopic phenomena forming the heart of this invention, i.e., the localized volumes of variant pH, are produced. Of course, with very small currents and voltages the operation is substantially slower than that at higher voltages and currents. The particular current and voltage which is most economical and hence preferable would be a function of, for example, electrolyte composition, electrode configuration, electrode composition and electrode size.

After a period of use, dependent upon the amount of ions removed from the solution and the capacity of the electrodes, it will be necessary to regenerate the electrodes. To do this, the polarity of the electrodes is simply reversed, thereby causing the electrodes to rapidly lose their adsorbed ions to the solution about them, producing a brackish waste solution. After suitable regeneration the electrodes are once again useful for the deionization of more water.

In the prior art, the strong acid and the strong base resins could not be regenerated in function contact with each other. That is, when a strong acid was used to regenerate the strongly acidic resin, the anions from that acid would foul any strongly basic resin to which they could migrate. Similarly, cations from a strong base regeneration would foul any strong acid resin present. Accordingly, columns of these strong resins had to be regenerated apart from each other. However, the resin-containing electrodes of the instant invention can be regenerated in the same solution. This advantageous property is due to the confining of the regenerative volumes of high and low pH respectively to the appropriate electrodes.

In regeneration of a cation exchange electrode, for instance, the electrode would be made positive, whereby $H^+$ ions would be formed near the surface of the carbon. These $H^+$ ions would exchange with the, e.g., RCOONa resulting from the deionization operation, producing a weak acid (RCOOH) and $Na^+$ ions.

The negative polarity of the anion exchange electrode during regeneration would produce $OH^-$ ions in small volumes near the surface of the carbon. These ions would exchange with the, e.g., $RNH_3Cl$ produced by the deionization operation of the anion exchange electrode, regenerating $RNH_3OH$ and producing $Cl^-$ ions.

It should be noted that the ions removed from the resin during the regeneration of the electrodes will, of course, tend to migrate towards the oppositely charged exchange electrode that is being regenerated. However, upon arrival at that electrode, the ions will, of course, not combine with an undissociated resin molecule. Since, during regeneration, the polarity of the electrodes does not favor dissociation of the resin, the resin is undissociated and therefore unaffected by migratory ions. $OH^-$ or $H^+$ ions produced on the carbon during regeneration would combine respectively with undissociated regenerated weak acid or base resin molecules if they were to be proximate to them. However, due to the intimate mingling of carbon and weak ion exchange resins near which $OH^-$ or $H^+$ is produced, the ion exchange resins substantially completely exchanges their captured ions with the $OH^-$ or $H^+$ ions produced at the electrode, thereby preventing their migration and combination. After regeneration, the brackish waste solvent is removed from the apparatus and a new working solution is introduced for deionization. It is envisioned that in many applications, the concentrated salt solution will not be useful. It is, however, recognized that such a concentrated solution might, in some applications, be the desired product of the process.

It must be appreciated that the exchange electrodes of the instant invention can be used singly if only one species of ion is desired to be removed or may be used jointly if it is desired to remove both anions and cations from a solution. The electrodes of the instant invention have been found to be especially useful in the purification of saline water, where, of course, it is desirable to remove both contaminating anions, predominantly $Cl^-$, and contaminating cations, predominantly $Na^+$. Labratory operations usually dictate the use of a batch process although a flow process is clearly feasible and in large scale operations would probably be more economical. In such a flow operation, the flow of saline water past electrodes would be such that the water would be deionized to the desired degree before leaving the processing volume. Suitable valving and bypassing would allow regeneration of the electrodes without disassembly or functional separation of the anion exchange electrodes from the cation exchange electrodes.

EXAMPLE

A water deionizing apparatus to purify water according to the instant invention was made. The anion exchange electrode was made by painting a mixture of 20 percent adhesive elastomer dissolved in toluene, 40 percent Amberlite CG4B, a weakly basic ion exchange resin, 25 percent Norit, a carbon black, and 15 percent graphite; painted in layers on a graphite backing. The cation responsive electrode was fashioned in a similar way except that Amberlite CG50, a weakly acidic ion exchange resin was used in place of the Amberlite CG4B. These electrodes were placed in a solution containing 1200 parts per million NaCl. The electrode area was 1.5 square centimeters, the current of 2.0 milliamperes was passed between the electrodes. The voltage between the electrodes was 1.0 volt. It was found that the electrodes had a capacity of $2.0 \times 10^{-4}$ equivalents of NaCl.

Of course, it must be understood that although sodium and chloride ions have been used as illustrative examples in the explanation of this invention, the invention is suitable for removal of all anions and cations from a contaminated solution. Examples of such ions are sulfate, nitrate, phosphate, calcium and magnesium.

Since it is obvious that many changes and modifications can be made in the above described details without departing from the nature and spirit of the invention, it is to be understood that the invention is not to be limited thereto except as set forth in the appended claims.

We claim:

1. The process of removing anions from an aqueous solution that comprises:

immersing in an aqueous solution at least part of an electrode comprising carbon that is capable of generating OH⁻ or H⁺ ions and a weak base ion exchange resin;
electrochemically dissociating the weak base ion exchange resin;
whereby the anions are combined with the resin.

2. The process of claim 1 wherein the anions are Cl⁻ ions.

3. The process of purifying water that comprises:
immersing in a solution at least part of each of at least two electrodes, one of which comprises carbon that is capable of generating H⁺ or OH⁻ ions and a weak base ion exchange resin; and
another of which comprises carbon that is capable of generating H⁺ or OH⁻ ions and a weak acid ion exchange resin;
electrochemically dissociating said ion exchange resins;
whereby anions and cations are removed from the solution.

4. The process of claim 3 wherein at least some of the anions are selected from the group consisting of chloride, sulfate, nitrate and phosphate ions and at least some of the cations are selected from the group consisting of sodium, calcium, and magnesium ions.

5. The process of claim 3 additionally comprising the step of regenerating spent ion exchange resins by electrochemically dissociating the exchange resins whereby ions previously removed from a solution and combined with the resins are exchanged for H⁺ and OH⁻ ions.

References Cited

UNITED STATES PATENTS

| 2,763,607 | 9/1956 | Staverman | 204—131 |
| 2,788,319 | 4/1957 | Pearson | 204—151 |
| 3,244,612 | 4/1966 | Murphy | 204—291 |

FOREIGN PATENTS 564,923   7/1957   Italy.

JOHN H. MACK, Primary Examiner
A. C. PRESCOTT, Assistant Examiner

U.S. Cl. X.R.
204—180, 294